(12) United States Patent
Fernández Gutiérrez

(10) Patent No.: US 8,644,310 B2
(45) Date of Patent: Feb. 4, 2014

(54) METHOD FOR MANAGING MULTICAST TRAFFIC BETWEEN EQUIPMENT IN A MULTICAST DATA NETWORK

(75) Inventor: Álvaro Fernández Gutiérrez, Barcelona (ES)

(73) Assignee: Media Patents, S.L. (ES)

( * ) Notice: Subject to any disclaimer, the term of this patent is extended or adjusted under 35 U.S.C. 154(b) by 913 days.

(21) Appl. No.: 12/756,849

(22) Filed: Apr. 8, 2010

(65) Prior Publication Data

US 2010/0254383 A1  Oct. 7, 2010

Related U.S. Application Data

(63) Continuation of application No. PCT/EP2008/000004, filed on Jan. 2, 2008.

(30) Foreign Application Priority Data

Oct. 30, 2007 (ES) .................................. 200702849

(51) Int. Cl.
*H04L 12/28* (2006.01)
*H04L 12/56* (2011.01)

(52) U.S. Cl.
USPC ............ 370/390; 370/432; 370/389; 370/392

(58) Field of Classification Search
USPC ............. 370/395.5, 432, 466, 467, 389–392; 709/230
See application file for complete search history.

(56) References Cited

U.S. PATENT DOCUMENTS

| | | | |
|---|---|---|---|
| 4,024,505 | A | 5/1977 | Sperling |
| 4,149,238 | A | 4/1979 | James et al. |
| 5,835,370 | A | 11/1998 | Nakamura |

(Continued)

FOREIGN PATENT DOCUMENTS

| | | |
|---|---|---|
| EP | 1185125 A1 | 3/2002 |
| EP | 1318628 A1 | 6/2003 |

(Continued)

OTHER PUBLICATIONS

Cain et al., "Internet Group Management Protocol, Version 3," Internet Engineering Task Force, Network Working Group; Request for Comments: 3376; Oct. 2002.

(Continued)

*Primary Examiner* — Chuong T Ho
(74) *Attorney, Agent, or Firm* — Cantor Colburn LLP

(57) ABSTRACT

In one implementation a method is provided that involves receiving in a network interface of a first router one or more PIM type messages from one or more second routers requesting one or more types of multicast traffic, storing in the first router a record for each network interface and each type of multicast traffic information that individually identifies the one or more second routers requesting the type of multicast traffic, and determining in the first router whether to transmit from the interface the one or more types of multicast traffic by use of the record. A method is also provided that involves individually tracking in an upstream PIM router the join membership of one or more individual downstream PIM routers that are coupled to a network interface of the upstream PIM router via a multi-access network without disabling Join message suppression in all the individual downstream PIM routers.

27 Claims, 1 Drawing Sheet

(56) References Cited

U.S. PATENT DOCUMENTS

| | | | |
|---|---|---|---|
| 6,331,983 B1 | 12/2001 | Haggerty et al. | |
| 6,370,142 B1 | 4/2002 | Pitcher et al. | |
| 6,393,507 B2 | 5/2002 | Klein | |
| 6,434,622 B1 | 8/2002 | Monteiro et al. | |
| 6,457,059 B1 | 9/2002 | Kobayashi | |
| 6,563,830 B1 * | 5/2003 | Gershon et al. | 370/395.53 |
| 6,721,318 B1 | 4/2004 | Cai et al. | |
| 6,741,595 B2 | 5/2004 | Maher, III et al. | |
| 6,785,294 B1 | 8/2004 | Ammitzoll et al. | |
| 6,914,907 B1 | 7/2005 | Bhardwaj et al. | |
| 6,977,891 B1 | 12/2005 | Ranjan et al. | |
| 7,068,598 B1 | 6/2006 | Bryson | |
| 7,236,465 B2 | 6/2007 | Banerjee et al. | |
| 7,272,652 B1 | 9/2007 | Keller-Tuberg | |
| 7,283,521 B1 | 10/2007 | Ryan | |
| 7,346,053 B1 | 3/2008 | Leung et al. | |
| 7,355,970 B2 | 4/2008 | Lor | |
| 7,385,977 B2 | 6/2008 | Wu et al. | |
| 7,412,726 B1 | 8/2008 | Viswanath | |
| 7,450,551 B2 | 11/2008 | Lim et al. | |
| 7,477,654 B2 | 1/2009 | Murray et al. | |
| 7,502,474 B2 | 3/2009 | Kaniz et al. | |
| 7,512,146 B1 | 3/2009 | Sivasankaran et al. | |
| 7,599,289 B2 | 10/2009 | Caci | |
| 7,599,393 B1 | 10/2009 | Ho | |
| 7,616,634 B2 * | 11/2009 | Gotoh et al. | 370/390 |
| 7,623,517 B2 * | 11/2009 | Suzuki | 370/390 |
| 7,640,333 B1 | 12/2009 | Fernandez Gutierrez | |
| 7,804,790 B1 * | 9/2010 | Aggarwal et al. | 370/256 |
| 7,933,267 B1 * | 4/2011 | Aggarwal et al. | 370/389 |
| 7,990,963 B1 * | 8/2011 | Aggarwal et al. | 370/390 |
| 8,184,630 B2 * | 5/2012 | Fernandez Gutierrez | 370/390 |
| 8,189,584 B2 * | 5/2012 | Fernandez Gutierrez | 370/390 |
| 2002/0099857 A1 | 7/2002 | Lowe et al. | |
| 2002/0126671 A1 * | 9/2002 | Ellis et al. | 370/390 |
| 2003/0067917 A1 | 4/2003 | Morrison et al. | |
| 2003/0123453 A1 | 7/2003 | Ooghe et al. | |
| 2004/0022244 A1 | 2/2004 | Boers et al. | |
| 2004/0035785 A1 * | 2/2004 | Rebholz | 210/603 |
| 2004/0090970 A1 | 5/2004 | Sanchez | |
| 2004/0117503 A1 | 6/2004 | Nguyen et al. | |
| 2004/0122890 A1 | 6/2004 | Watkinson | |
| 2004/0158872 A1 | 8/2004 | Kobayashi | |
| 2004/0165709 A1 | 8/2004 | Pence et al. | |
| 2004/0190542 A1 | 9/2004 | Ono et al. | |
| 2004/0202295 A1 | 10/2004 | Shen et al. | |
| 2004/0219911 A1 | 11/2004 | Kouchri et al. | |
| 2004/0252690 A1 | 12/2004 | Pung et al. | |
| 2004/0255126 A1 | 12/2004 | Reith | |
| 2005/0041680 A1 | 2/2005 | Tanaka et al. | |
| 2005/0063544 A1 | 3/2005 | Uusitalo et al. | |
| 2005/0174937 A1 | 8/2005 | Scoggins et al. | |
| 2005/0175156 A1 | 8/2005 | Afshar et al. | |
| 2005/0190765 A1 | 9/2005 | Gotoh et al. | |
| 2005/0207354 A1 | 9/2005 | Nekovee et al. | |
| 2005/0265374 A1 | 12/2005 | Pelt | |
| 2006/0007930 A1 | 1/2006 | Dorenbosch | |
| 2006/0018255 A1 | 1/2006 | Tankhiwale | |
| 2006/0036733 A1 | 2/2006 | Fujimoto et al. | |
| 2006/0050643 A1 | 3/2006 | Yoshimoto et al. | |
| 2006/0059163 A1 | 3/2006 | Frattura et al. | |
| 2006/0088031 A1 | 4/2006 | Nalawade | |
| 2006/0095766 A1 | 5/2006 | Zhu et al. | |
| 2006/0104308 A1 | 5/2006 | Pinkerton et al. | |
| 2006/0114908 A1 | 6/2006 | Kalkunte et al. | |
| 2006/0120368 A1 | 6/2006 | Aboukarr et al. | |
| 2006/0146792 A1 | 7/2006 | Ramachandran et al. | |
| 2006/0146857 A1 | 7/2006 | Naik et al. | |
| 2006/0159092 A1 | 7/2006 | Boers et al. | |
| 2006/0182109 A1 | 8/2006 | Melsen et al. | |
| 2006/0209829 A1 | 9/2006 | Lo et al. | |
| 2006/0221861 A1 | 10/2006 | Previdi et al. | |
| 2006/0221958 A1 | 10/2006 | Wijnands et al. | |
| 2006/0239289 A1 | 10/2006 | Zheng et al. | |
| 2006/0262792 A1 | 11/2006 | Rokui | |
| 2006/0274720 A1 | 12/2006 | Adams et al. | |
| 2007/0011350 A1 | 1/2007 | Lu et al. | |
| 2007/0041558 A1 | 2/2007 | Parayil et al. | |
| 2007/0047545 A1 * | 3/2007 | Bou-Diab et al. | 370/390 |
| 2007/0064695 A1 | 3/2007 | Song et al. | |
| 2007/0124454 A1 | 5/2007 | Watkinson | |
| 2007/0143858 A1 | 6/2007 | Hearty | |
| 2007/0168555 A1 | 7/2007 | Dorenbosch | |
| 2007/0177594 A1 | 8/2007 | Kompella | |
| 2007/0183403 A1 | 8/2007 | Somers | |
| 2007/0211722 A1 | 9/2007 | Subramanian | |
| 2007/0255824 A1 | 11/2007 | Granzer | |
| 2007/0297376 A1 | 12/2007 | Gass | |
| 2007/0297418 A1 | 12/2007 | Lee | |
| 2008/0056243 A1 | 3/2008 | Roy et al. | |
| 2008/0095146 A1 | 4/2008 | Granzer | |
| 2008/0095183 A1 | 4/2008 | Bijwaard et al. | |
| 2008/0123644 A1 | 5/2008 | Storry et al. | |
| 2008/0219237 A1 | 9/2008 | Thubert et al. | |
| 2009/0059911 A1 | 3/2009 | Fine | |
| 2009/0100147 A1 | 4/2009 | Igarashi | |
| 2009/0100194 A1 | 4/2009 | Bhadri et al. | |
| 2009/0190518 A1 | 7/2009 | Kim et al. | |
| 2009/0227003 A1 * | 9/2009 | Blotsky et al. | 435/257.1 |
| 2009/0310609 A1 | 12/2009 | Fernandez Gutierrez | |
| 2009/0319689 A1 | 12/2009 | Fernandez Gutierrez | |
| 2010/0005499 A1 | 1/2010 | Covey | |
| 2010/0014519 A1 | 1/2010 | Fernandez Gutierrez | |
| 2010/0040056 A1 | 2/2010 | Kobayashi | |
| 2010/0046516 A1 | 2/2010 | Fernandez Gutierrez | |
| 2010/0054247 A1 | 3/2010 | Fernandez Gutierrez | |
| 2010/0054248 A1 | 3/2010 | Fernandez Gutierrez | |
| 2010/0054249 A1 | 3/2010 | Fernandez Gutierrez | |
| 2010/0172351 A1 | 7/2010 | Fernandez Gutierrez | |
| 2010/0172352 A1 | 7/2010 | Fernandez Gutierrez | |
| 2010/0172353 A1 | 7/2010 | Fernandez Gutierrez | |
| 2010/0183008 A1 | 7/2010 | Fernandez Gutierrez | |
| 2011/0010441 A1 | 1/2011 | Fernandez Gutierrez | |
| 2011/0019673 A1 | 1/2011 | Fernandez Gutierrez | |
| 2011/0058548 A1 | 3/2011 | Fernandez Gutierrez | |
| 2011/0058551 A1 | 3/2011 | Fernandez Gutierrez | |

FOREIGN PATENT DOCUMENTS

| | | |
|---|---|---|
| EP | 1389862 A1 | 2/2004 |
| EP | 1429489 A2 | 6/2004 |
| EP | 1432172 A2 | 6/2004 |
| EP | 1734688 A1 | 12/2006 |
| EP | 2078376 B2 | 12/2010 |
| WO | 02/03614 A2 | 1/2002 |
| WO | 2006001803 A1 | 1/2006 |
| WO | 2009000306 A1 | 12/2008 |
| WO | WO2009/000306 A1 | 12/2008 |
| WO | WO2009000306 | 12/2008 |
| WO | WO2009049659 | 4/2009 |
| WO | WO2009056175 | 5/2009 |
| WO | WO2009065526 | 5/2009 |
| WO | 2009095041 A1 | 8/2009 |
| WO | WO2009095041 | 8/2009 |
| WO | WO2009109684 | 9/2009 |
| WO | WO2010072611 A1 | 7/2010 |
| WO | WO2010097288 A1 | 9/2010 |
| WO | WO2011012582 A1 | 2/2011 |

OTHER PUBLICATIONS

PCT Application No. PCT/EP2010/060815; Patent Cooperation Treaty International Search Report and Written Opinion issued by the European Patent Office dated Feb. 8, 2011.

Office Action for European Application No. 08 700 962.7-1525, European Patent Office, Berlin, Germany, mailed on Dec. 1, 2010, (6 pages).

Office Action for European Application No. 08 700 962.7-1525, European Patent Office, Berlin, Germany, mailed on Aug. 30, 2011 (7 pages).

Fenner, "Protocol Independent Multicast—Sparse Mode (PIM-SM) Protocol Specification (Revised)", The Internet Society, AT&T Labs—Research, Aug. 2006, pp. 1-151.

(56) References Cited

OTHER PUBLICATIONS

K. McCloghrie et al., Internet Engineering Task Force, Request for Comments 2578, "The structure of Management Information Version 2, SMIv2", Apr. 1999; currently available on the Internet at http://www3.tools.ietf.org/html/rfc2578.

K. McCloghrie et al., Internet Engineering Task Force, Request for Comments 2579, "Textual Conventions for SMIv2", Apr. 1999; currently available on the Internet at http://www3.tools.ietf.org/html/rfc2579.

D. Harrington et al., Internet Engineering Task Force, Request for Comments 3411, "An Architecture for Describing Simple Network Management Protocol (SNMP) Management Frameworks", Dec. 2002, currently available on the Internet at http://www3.tools.ietf.org/html/rfc3411.

E. Al-Shaer et al., "Toward Integrating IP Multicasting in Internet Network Management Protocols", Computer Communications, vol. 24, No. 5, Mar. 15, 2001, pp. 473-485, Publisher: Elsevier.

R. Vida et al., Engineering Task Force, Network Working Group, Request for Comments 3810, Jun. 2004; currently available at Internet address http://tools.ietf.org/html/rfc3810.

B. Fenner et al., Engineering Task Force, Network Working Group, Request for Comments 4605, Aug. 2006; currently available at Internet address http://tools.ietf.org/html/rfc4605.

B. Fenner et al., Engineering Task Force, Network Working Group, Request for Comments 4601, Aug. 2006; currently available at Internet address http://tools.ietf.org/html/rfc4601.

International Preliminary Report on Patentability for PCT/ES2009/070047 dated Oct. 14, 2010.

European Search Report for European Patent Application No. 10189098.6 issued by the European Patent Office dated Dec. 10, 2010.

El-Derini, M.N. et al., Supporting a Multicast Communication for Large Scale Groups, 2002, IEEE MELECON, p. 7-p. 11.

Lawful Interception (LI); Handover Interface and Service-Specific Details (SSD) for IP delivery; Part 5: Service-Specific Details for IP Multimedia Services; ETSI TS 102 232-5 ETSI Standards, Lis, Sophia Antipolis Cedex, France, vol. LI, No. V2.3.1, Apr. 1, 2008, XP014041613, ISSN: 0000-0001, p. 6-p. 7, p. 10-p. 15.

M Handley UCL V Jacobson Packet Design C Perkins University of Glasgow: "SDP: Session Description Protocol; rfc4566.txt" IETF Standard, Internet Engineering Task Force, IETF, CH, Jul. 1, 2006, XP015055003, ISSN: 0000-0003, p. 11.

European Patent Office, Transmittal of International Search Report and the Written Opinion of the International Searching Authority for International Application No. PCT/EP2009/061577, Feb. 8, 2010.

Communications Assistance for Law Enforcement Act of 1994, At the Second Session, One Hundred Third Congress of the United States of America, Pub. L. No. 103-414, 108 Stat. 4279; Amendment to Title 18, United States Code, Approved Oct. 25, 1994.

Cain, B. et al., Internet Group Management Protocol, Version 3, 2002, Network Working Group.

Fan, Rui et al., WRHMCC: A New Congestion Control Mechanism for Multicast Applications, GLOBECOM 22003, p. 2845-p. 2849, Globecom, 2003.

Pompili, Dario et al., Multicast Algorithms in Service Overlay Networks, Computer Communications, Feb. 2008, vol. 31, Issue 3, p. 489-p. 505.

Lawson, Stephen, IP Multicast Finds a Role Inside the Firewall, 1996, InfoWorld 18.n41, p. 51(1).

Zhang, Beichuan et al., Universal IP Multicast Delivery, Computer Networks, Apr. 13, 2006, p. 781-p. 806, Elsevier, Amsterdam.

Deering, Stephen et al., An Architecture for Wide-Area Multicast Routing, SIGCOMM 94: Proceedings of the Conference on Communications, Architectures, Protocols and Applications.

Deering, Stephen et al., The PIM Architecture for Wide-Area Multicast Routing, IEEE/ACM Transactions on Networking (TON), 1996, vol. 4, No. 2, IEEE.

Ritvanen, Kaarle, Multicast Routing and Addressing, Seminar on Internetworking, 2004.

Paul, Pragyansmita et al., Survey of Multicast Routing Algorithms and Protocols, Proceedings of the 15th International Conference on Computer Communication, 2002.

\* cited by examiner

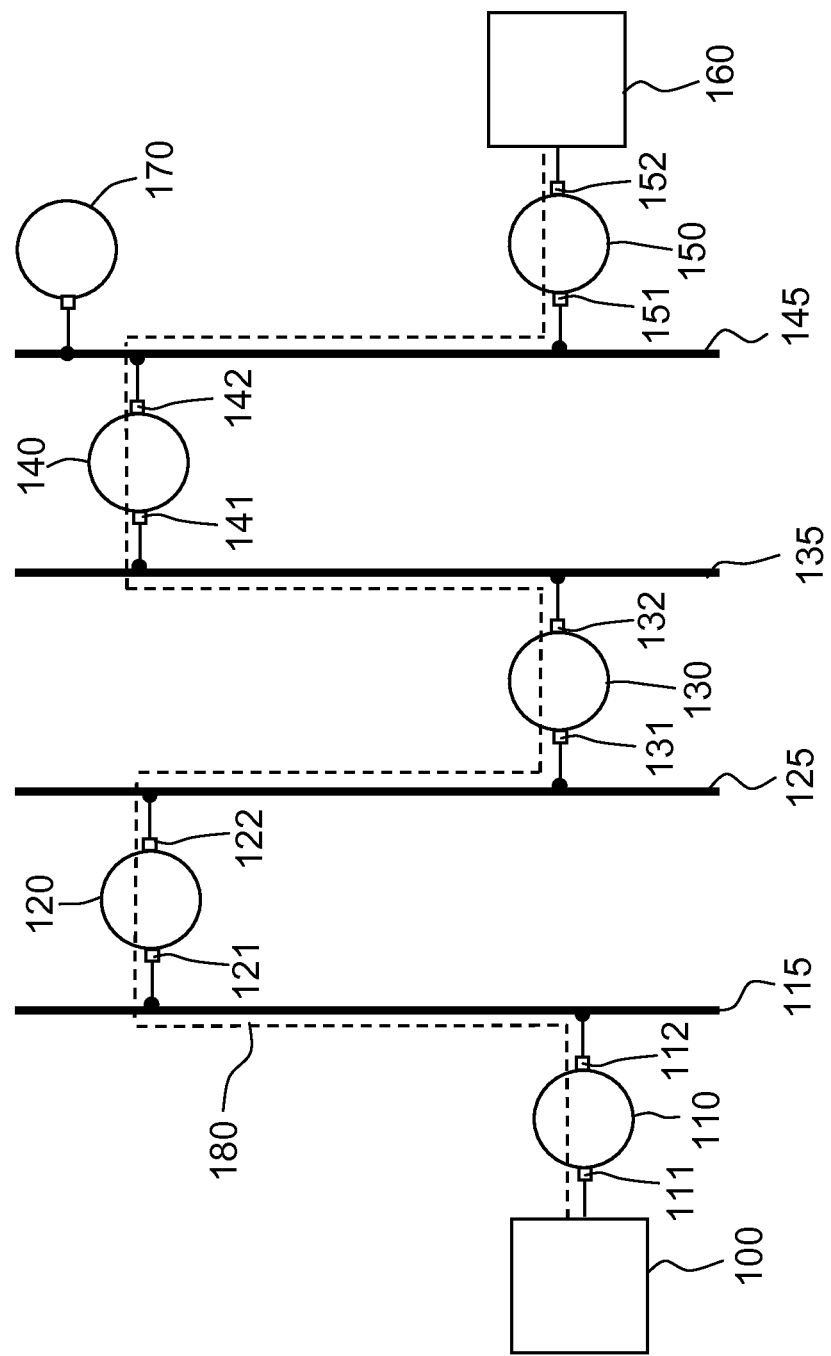

METHOD FOR MANAGING MULTICAST TRAFFIC BETWEEN EQUIPMENT IN A MULTICAST DATA NETWORK

CROSS-REFERENCE TO RELATED APPLICATIONS

This application claims priority to and the benefit of PCT/EP2008/000004 filed Jan. 2, 2008, which claims priority to and the benefit of Spanish Patent Application No. P200702849 filed Oct. 30, 2007.

FIELD

The invention relates to methods and equipment for managing multicast traffic in a multicast data network.

BACKGROUND

Multicast technology makes it possible to send data from a single source to many recipients through a data network, without having to set up unicast communication, i.e. one-to-one individual communication between the source and each of the recipients. To that end the source sends data, in data packet form, to a single address associated to a multicast group to which the equipment interested in being recipients of said data sending can subscribe. This address, referred to as a multicast address or also as a multicast group address, is an IP (Internet Protocol) address chosen within a range that is reserved for multicast applications. The data packets which have been sent by the source to the multicast address are then replicated in the different network routers so that they can reach the recipients that have joined the multicast group.

The recipients which receive data in a multicast group are usually equipment connected to the data network by means of a proxy or a router.

Hereinafter, the common term host will be used to refer to said recipient equipment. A host can be, for example, a computer or a set-top box (digital signal decoder) connected to a television set.

When a host wants to receive the information sent by one or several sources of a multicast group, it sends to the closest router, or to an intermediate proxy, a subscription message to subscribe to said group so that the router transmits to it the data arriving through the data network and which has been sent by the sources of the multicast group. Likewise, when a host wishes to stop receiving data sending in the multicast group, it sends to the router or to the proxy an unsubscribe message to stop receiving them.

The messages exchanged between a host and the closest router to manage membership to a multicast group use the IGMP protocol (Internet Group Management Protocol) or the MLD (Multicast Listener Discovery) protocol, according to whether or not the router works with version 4 (IPv4) or version 6 (IPv6) of the IP protocol (Internet Protocol), respectively.

The routers exchange messages with one another for the purpose of defining the routing which allows efficiently routing the data from the sources to the hosts that have subscribed to a multicast group. To that end, the routers use specific protocols, including the very well known PIM-SM (Protocol Independent Multicast—Sparse Mode).

In summary, the routers receive from the hosts, in the form of IGMP/MLD messages, information specifying which multicast groups they want to receive traffic from, and they communicate with other routers, for example by means of the PIM-SM protocol, for the purpose of setting up a routing which takes the traffic requested by the hosts to such hosts.

All the mentioned protocols are defined and documented by the Internet Engineering Task Force (IETF).

The IGMP protocol version currently being used is IGMPv3, which is described in the RFC 3376 specifications published on line by the IETF (B. Cain et al., Engineering Task Force, Network Working Group, Request for Comments 3376, October 2002.

With regard to the MLD protocol, the version currently being used is MLDv2, which is described in the RFC 3810 specifications published on line by the IETF (R. Vida et al., Engineering Task Force, Network Working Group, Request for Comments 3810, June 2004.

The PIM-SM protocol used for the communication between routers is described in the RFC 4601 specifications published on line by the IETF (B. Fenner et al., Engineering Task Force, Network Working Group, Request for Comments 4601, August 2006.

Hereinafter, and in accordance with the common nomenclature in SSM technology, the sending of the source S from the multicast group G, where S is an IP address identifying the source sending the data and G is an IP address, within the range reserved for multicast groups, identifying the multicast group, is referred to as channel (S,G).

Hereinafter the expressions upstream and downstream will likewise be used to indicate relative locations from network equipment: the expression upstream relates to a location in the direction towards the multicast source and the expression downstream relates to a location in the opposite direction.

In the first multicast routing protocols, such as the DVMRP protocol (Distance Vector Multicast Routing Protocol) for example, the routers exchanged between one another messages called "DVMRP Route Reports" with information to build the multicast topology database. The multicast topology database is where the routers store the information from all the multicast routers existing in the network and how they are connected to one another. In the DVMRP protocol, each router sent these messages every 60 seconds.

The PIM-SM protocol works in a different manner. The PIM-SM routers do not send messages to create the multicast topology database, but rather they use the unicast database of the router to deduce from it the multicast topology database and they do so independently of the unicast protocol that the router uses. This is the reason for the name Protocol Independent Multicast. PIM-SM therefore does not depend on any specific unicast protocol and can create the multicast topology database in the routers independently of the unicast protocol that each router uses.

In the PIM-SM protocol the multicast topology database is stored in a table called MRIB (Multicast Routing Information Base) which is used, among other purposes, for deciding which router the JOIN/PRUNE messages should be sent to. These JOIN/PRUNE messages of the PIM-SM protocol, which are well-known by the person skilled in the art, are the messages sent by one PIM-SM router to another PIM-SM router to indicate that it wishes to receive multicast traffic (JOIN messages) or that it wishes to stop receiving multicast traffic (PRUNE messages). The multicast data are transmitted towards the router that has requested multicast traffic following the same way as the JOIN messages, but in the opposite direction.

A first drawback of the PIM-SM protocol is the delay in transmitting the PRUNE-type messages that one PIM-SM router sends to another PIM-SM router to indicate that it no longer wishes to keep receiving a specific multicast traffic.

When a PIM-SM router receives a PRUNE-type message, for example PRUNE (S,G), it does not immediately stop transmitting the traffic from the multicast channel (S,G), but rather it waits for a specific time before it stops transmitting the multicast channel (S,G) through its network interface where it has received the PRUNE-type message. In the PIM-SM protocol default configuration, this wait time is 3 seconds. The reason for this wait time is that there may be other PIM-SM routers sharing a multiaccess network and it is possible that there is another PIM-SM router that wishes to keep receiving the multicast channel (S,G), therefore said router must send a JOIN(S,G) message immediately in order to cancel the effect of the previous PRUNE(S,G) message.

If the number of routers is high and there are thousands of users switching multicast channels, the consequence is that there is a huge amount of bandwidth occupied in the network due to the latency or delay in suppressing the transmission of unwanted multicast channels. The problem is considerably aggravated if the multicast channels (S,G) furthermore transmit video or IPTV channels requiring, for example, a bandwidth of between 4 Mbits/s in normal resolution and 20 Mbits/s in high resolution.

Section 4.3.3. of RFC 4601, "Reducing PRUNE Propagation Delay on LANs", proposes a solution to the latency problem that consists of using the Hello messages that the PIM-SM routers use to exchange information with one another and to negotiate several parameters. Hello messages are used, for example, to negotiate whether or not there is a suppression of PIM-SM messages, the delay time in the PRUNE messages and other parameters. The PIM-SM routers send these Hello messages periodically through each network interface of the router in which the PIM-SM protocol is being executed, to a multicast address called "ALL-PIM-ROUTERS". As a result of these Hello messages, each PIM-SM router knows the existence of other PIM-SM routers connected in each of its network interfaces. All the routers also store the configuration information for the other routers which has been exchanged by means of Hello messages.

However, the Hello messages used in the PIM-SM protocol do not transmit information on the topology of multicast routers. The PIM-SM router deduces this information based on unicast routing tables.

As previously stated, when a PIM-SM router receives a PRUNE(S,G)-type message it waits for a certain time to see if there is another router sending a JOIN(S,G) message canceling the first PRUNE message. The wait time is the sum of two variables called Effective_propagation_Delay and Effective_Override_Interval, which by default take the values of 0.5 seconds and 2.5 seconds, respectively. The reason for using this sum of two variables as a delay is the following: if there is a router R1 that is receiving traffic of the multicast channel (S,G) from a router R2, and router R1 sees that another router R3 sends a PRUNE(S,G) message, router R1 must send a JOIN(S,G)-type message to router R2 to cancel the effect of the PRUNE(S,G) message before the Effective_Override_Interval time. Since the Effective_Override_Interval is always less than the sum of Effective_Override_Interval and Effective_propagation_Delay, the JOIN(S,G) message of router R1 will reach router R2 before router R2 stops sending traffic of the multicast channel (S,G).

The solution proposed in RFC 4601 for reducing the latency time consists of the fact that PIM-SM routers use the Hello messages to reduce the values of the Effective_propagation_Delay and Effective_Override_Interval variables. To that end, all PIM-SM routers announce their own Propagation_Delay and Override_Interval parameters in the Hello messages. These parameters are contained in the Hello messages in a data block called LAN_PRUNE_Delay. When all the routers executing the PIM-SM protocol in a network have sent Hello messages including the LAN_PRUNE_Delay data block, all the routers connected to one and the same multiaccess network use as Effective_propagation_Delay and Effective_Override_Interval values the maximum values of the Propagation_Delay and Override_Interval parameters, respectively, that have been announced by said routers in the Hello messages.

However, this mechanism has several limitations. In the first place, the RFC 4601 indicate that if the Effective_propagation_Delay and Effective_Override_Interval variables take very low values, it is possible that, in following with the previous example, router R2 suppresses the traffic of channel (S,G) before router R1 has time to send its JOIN message or before router R2 has time to process said message. To prevent this problem, RFC 4601 recommend not lowering the values of these variables too much. This is a serious limitation of this latency reduction mechanism.

Furthermore, another limitation or problem that this latency reduction mechanism has is that it is necessary for all the routers executing the PIM-SM protocol in a network to send messages including the LAN_PRUNE_Delay data block. If there is a router that does not include this data block in its Hello messages, this latency reduction mechanism can no longer be used and the Effective_propagation_Delay and Effective_Override_Interval variables take their default values, which are 2.5 seconds and 0.5 seconds respectively, in all the routers of the multiaccess network, therefore causing a latency of 3 seconds in each router.

In addition, at the end of the mentioned section 4.3.3 of RFC 4601 relating to latency reduction, it is explained that it is possible for an Upstream PIM-SM router to have individual control or tracking of the multicast traffic requests of several downstream routers. Though it does not explain how to implement said individual tracking or what utility it has, it does indicate that to do so it is essential for all the routers of the same multiaccess network to first agree to cancel the message suppression. The mentioned section 4.3.3 of RFC 4601 even includes the code that can be used to check that all the routers have agreed to cancel the message suppression.

A second problem affecting the PIM-SM protocol is the complexity of the JOIN message suppression mechanism. Basically, JOIN message suppression consists of if a downstream router R1 sees that another downstream router R2 sends a JOIN message requesting the same multicast traffic that it was going to request, said router R1 can suppress its own JOIN message, since it is sufficient that the upstream router receives a single request to transmit the requested multicast traffic.

In the latest version of the IGMP protocol multicast (IGMPv3 version), by means of which hosts request multicast traffic from a router, the message suppression, which existed in the previous IGMP versions, has been canceled. In contrast, in the PIM-SM protocol, by means of which a router requests multicast traffic from another router, message suppression still exists. In fact, message suppression is the default configuration to be applied according to RFC 4601. There is a configuration option available so that message suppression is not carried out, but it is applied only in specific circumstances and requires a complex implementation.

The message suppression mechanism that is applied in the PIM-SM protocol, according to RFC 4601, is very complicated. The message suppression cancellation mechanism is also very complicated according to RFC 4601. Therefore any modification of the PIM-SM protocol relating to message suppression is very complicated. This probably explains the lack of investigation for improvements in the PIM-SM protocol relating to message suppression. Additionally, the end of mentioned section 4.3.3 of RFC 4601 indicates that in order to perform individual tracking of the multicast traffic requested by each downstream router, it is necessary to cancel the message suppression. According to RFC 4601, if there are routers suppressing messages it is not possible to perform individual tracking of the multicast traffic requested by each router.

The following description illustrates the complexity of the message suppression mechanism and the conditions for canceling said message suppression, according to RFC 4601.

To explain the message suppression mechanism a person skilled in the art has to analyze and understand in detail the state machine called upstream (S,G), by means of which RFC 4601 specify the operation of the upstream sending of JOIN (S,G)-type messages. This state machine is shown in table form in section 4.5.7 "Sending (S,G) Join/Prune messages" of RFC 4601.

Each upstream state machine (S,G) is independent for each network interface of the router and for each multicast channel (S,G) and has only two states: the Not_Joined state, which means that the router does not need to receive the multicast channel (S,G) through said network interface, and the Joined state, which means that the router needs to receive the multicast channel (S,G) through said network interface.

If the state machine is in the Not_Joined state, and therefore the router is not receiving the multicast channel (S,G), and a "JoinDesired(S,G)→true" event occurs, indicating that the router has received a request for traffic of channel (S,G) from another downstream router, the state machine of the router executes the following actions: switching the state to Joined, sending a JOIN(S,G) message to another upstream router appearing in its MRIB table as suitable for sending it traffic of channel (S,G), and initializing a timer called Join_Timer at an initial value called t_periodic.

In the Joined state, when the "Timer Expires" event occurs, indicating that the Join_Timer has reached zero, the router sends (Send Join(S,G)) a new JOIN(S,G) message and reinitializes the Join_Timer at the t_periodic value.

Therefore, in the Joined state the router periodically sends the JOIN(S,G) messages again to keep receiving traffic of the multicast channel (S,G).

When the "See Join(S,G) to RPF'(S,G)" event occurs, indicating that router has seen in the multiaccess network it is connected to that another router has sent a message similar to the JOIN(S,G) message that it has to send when the Join_Timer reaches zero, the router increases the Join_Timer value to delay the sending of its own JOIN(S,G) message. This is explained in greater detail on page 74 of RFC 4601, indicating that if the Join_Timer has a value that is less than a variable called t_joinsuppress, then said Join_Timer is initialized with the value of this t_joinsuppress variable. However, if the Join_Timer has a value that is greater than the t_joinsuppress variable, then the Join_Timer is not modified.

Therefore, the message suppression mechanism of the PIM-SM protocol consists of increasing the value of the Join_Timer controlling the periodic sending of JOIN(S,G) messages. Since the Join_Timer is increased up to the t_joinsuppress value every time the router sees a JOIN(S,G) message of another router in the multiaccess network, the Join_Timer is periodically reinitialized at the t_joinsuppress value and never reaches zero. This is what makes the router not send its own JOIN(S,G) message, i.e. it suppresses its own periodic JOIN(S,G) message as long as there is another router in the same multiaccess network that is sending an equivalent JOIN (S,G) message.

Message suppression in the PIM-SM protocol has been explained up to this point. Explained below is how the mechanism canceling said message suppression works.

The mechanism to cancel message suppression in the PIM-SM protocol, as deduced from RFC 4601, consists of making the value of the t_joinsuppress variable zero. When the router sees a JOIN(S,G) message it checks to see if the Join_Timer is less than the t_joinsuppress variable, which is equal to zero, which obviously never occurs, and said Join_Timer is left unmodified. The router thus sends its own JOIN(S,G) message when its Join_Timer, which is not modified by the messages of the other routers, reaches zero.

The t_joinsuppress variable takes the lowest value between the value of another variable called t_suppressed and a parameter called holdtime which is transmitted in the JOIN (S,G) messages and indicates for how much time the router that has sent the JOIN(S,G) message wishes to be receiving the channel (S,G). The t_suppressed variable takes a different value depending on whether or not message suppression is enabled. There is a function called Suppression_Enabled(I) which is specific for each network interface I and returns the value TRUE if message suppression is enabled, and the value FALSE if message suppression is cancelled:

If the Supression_Enabled(I) function returns a TRUE value, then the t_suppressed variable takes a random value within the range [1,1*t_periodic; 1,4*t_periodic], where t_periodic is a variable taking the value of 60 seconds by default.

If the Supression_Enabled(I) function returns the FALSE value, the t_suppressed variable is zero, and the t_joinsuppress variable is also zero, taking the lowest value between t_suppressed and the holdtime parameter. Modifying the Join_Timer when the Supression_Enabled(I) function returns a FALSE value is thus prevented and each router thus sends its periodic JOIN(S,G) messages without taking into account the JOIN(S,G) messages the other routers send, whereby canceling message suppression.

This message suppression cancellation mechanism defined in RFC 4601 is unnecessarily complicated. It is also inefficient because if the Supression_Enabled(I) function returns a FALSE value, before having made the decision of whether or not to modify the Join_Timer, the router will have checked two times to see if a positive quantity is less tan zero, something which cannot happen.

Since the PIM-SM protocol is a complex protocol, programmers designing applications implementing said protocol follow RFC 4601 specifications in the most exact manner possible to prevent finding new design problems that are not provided for in said specifications. As a result, applications implementing the PIM-SM protocol have the previously explained limitations. These limitations, along with the complexity involved with message suppression in the PIM-SM protocol, are the reasons that no satisfactory solution to the latency problem in the PIM-SM protocol has been developed up until now.

SUMMARY

One purpose of the invention is to provide an improved system for managing multicast communications between routers communicating by means of a protocol integrating the PIM protocol (Protocol Independent Multicast), such as the PIM-SM protocol (Protocol Independent Multicast—Sparse Mode) for example.

An objective of the invention is to offer a solution that allows performing individual tracking of the multicast traffic requested by each router, without the need for all the routers to first agree to cancel message suppression.

Another objective of the invention is to offer a solution that allows eliminating the latency problem occurring in the prior art and consisting of the accumulation of significant delays before a router can cut off the sending of multicast traffic that is no longer required by any downstream router.

Another objective of the invention is that an improved router according to the invention can operate without any problems in a network comprising both improved routers according to the invention and routers according to the prior art.

Another objective of the invention is to facilitate implementation of the PIM Snooping function in switches. This PIM Snooping function and what it consists of will be explained later in the detailed description of embodiments of the invention.

According to one implementation, a method for managing multicast traffic between routers communicating by means of a router-to-router communication protocol, such as a PIM type of protocol; and router and switch involved in said method. In one implementation the routers send messages according to said protocol to request or to reject a type of multicast traffic. At least one of said routers is an improved router which: when it receives one of said messages, obtains in said message an address of the router that has sent said message; stores in a record, for each network interface through which it receives said messages and for each type of multicast traffic requested, the addresses of the routers interested in receiving said type of multicast traffic; and uses the information contained in said record to decide whether or not to transmit said type of multicast traffic through said network interface.

In one implementation a method for managing multicast traffic between routers communicating by means of a protocol integrating, or otherwise using a portion of or a version of a PIM protocol (Protocol Independent Multicast") is provided in which method a router sends to another router messages to request a type of multicast traffic or to reject a type of multicast traffic, wherein at least one of said routers is an improved router which:
when it receives one of said messages sent by another router, obtains in said message an address of the router that has sent said message;
stores in a record, for each network interface through which it receives said messages and for each requested type of multicast traffic, the addresses of the routers interested in receiving said type of multicast traffic; and
uses the information contained in said record to decide whether to transmit or to stop transmitting said type of multicast traffic through said network interface.

Before cutting off the transmission of a specific type of multicast traffic through some of its network interfaces, an improved router according to one implementation uses the information contained in said record to check if there is any router connected to said network interface and interested in receiving said type of multicast traffic. Advantageously, if in said check said improved router finds that there is no router connected to said network interface and interested in receiving said type of multicast traffic, it cuts off the transmission of said type of multicast traffic through said network interface without waiting to receive other messages requesting said type of multicast traffic through said network interface.

Information is preferably included in said messages according to said protocol integrating, or otherwise using a portion of or using a version of the PIM protocol indicating if the router that has sent said message is one of said improved routers.

In one implementation, an improved router carries out the following actions:
it detects, as a result of said information included in said messages, if an upstream router from which it is receiving multicast traffic is or is not an improved router;
it detects when another router sends a PRUNE-type message to said upstream router indicating it to stop transmitting a type of multicast traffic that said improved router wishes to keep receiving; and
if said upstream router that has received said PRUNE-type message is not an improved router, said improved router sends a JOIN-type message to said upstream router indicating that it wishes to receive said type of multicast traffic, to cancel the effect of said PRUNE-type message.

In one implementation, an improved router maintains for each network interface and type of multicast traffic:
a general timer, which is restarted when said router receives through said network interface a message of any other router in which the latter indicates that it wishes to receive said type of multicast traffic;
a specific timer associated to each router address stored in said record for said network interface and type of multicast traffic, which is restarted when said router receives through said network interface a message of the router the address of which is associated to said specific timer and in which the latter router indicates that it wishes to receive said type of multicast traffic;
and said improved router cuts off the transmission of said type of multicast traffic through said network interface when any one of the following two conditions is met:
said general timer reaches zero;
said specific timer reaches zero and, in addition, the information contained in said record indicates that the router the address of which is associated to said specific timer is the only router connected to said network interface and interested in receiving said type of multicast traffic.

The invention also contemplates an application in which an improved router according to the invention stores, associated to each router address contained in said record, specifications relating to the accounting and/or to the authorization for the transmission of multicast traffic to said router address, and said improved router, according to said specifications, accounts for and/or authorizes the transmission of multicast traffic to said router address.

One method includes the case in which at least one improved switch is placed between two of said routers, such that said improved switch receives through one of its network ports one of said messages sent by the routers according to said protocol integrating, or otherwise using a portion of or a version of the PIM protocol, and said improved switch:
conducts snooping in said message and obtains by means of said snooping an address of the router that has sent said message and information identifying the type of multicast traffic requested in said message;
stores in a record, for each network port through which it receives said messages and for each type of multicast traffic requested, the addresses of the routers interested in receiving said type of multicast traffic; and
uses the information contained in said record to decide whether to transmit or to stop transmitting said type of multicast traffic through said network port.

Aspects of the invention also relate to improved routers and to improved switches that store executable instructions for performing the various actions disclosed herein.

BRIEF DESCRIPTION OF THE DRAWINGS

Other advantages and features of the invention will be seen based on the following description in which several preferred non-limiting embodiments of the invention are described in reference to the attached drawing.

FIG. 1 shows a simplified example of a multicast communications system.

DETAILED DESCRIPTION

FIG. 1 shows a simplified example of a multicast communications system in which six PIM-SM routers 110, 120, 130, 140, 150 and 170 operate. A source 100 sending a multicast channel (S,G) is connected to the router 110, which transmits said multicast channel by means of PIM-SM routers 110, 120, 130 and 140, until reaching router 150 which is connected to a host 160 that wishes to receive said channel (S,G). The host 160 indicates to router 150 the multicast traffic that it wishes to receive. To that end, in some implementations the host 160 and router 150 communicate by means of the IGMPv3 protocol or the MLDv2 protocol.

Router 140 and router 150 are connected to one another by means of a local multiaccess network 145, for example an Ethernet network, to which other PIM-SM routers can be connected. The FIGURE only shows one other PIM-SM router 170 connected to the multiaccess network 145, but there can obviously be more PIM-SM routers connected to said network 145. In the same manner there is another local multiaccess network 135 between routers 140 and 130, another multiaccess network 125 between routers 130 and 120 and another multiaccess network 115 between routers 120 and 110. In each of these multiaccess networks 115, 125 and 135 there can be other PIM-SM routers connected thereto which are not shown in the FIGURE for the sake of simplifying it.

In the example, each router 110, 120, 130, 140 and 150 has an upstream network interface, respectively 111, 121, 131, 141 and 151, and a downstream network interface, respectively 112, 122, 132, 142 and 152.

The multicast channel (S,G) is transmitted from the source 100 towards the host 160 following the path 180 indicated with a dotted line going through routers 110, 120, 130, 140 and 150 of the FIGURE until reaching the host 160.

The PIM-SM messages follow the same path 180, but in the opposite direction of the data going from the source 100 to the host 160 receiving said traffic, and they are transmitted from router 150 towards router 110 passing through intermediate routers 140, 130 and 120. In the case of the multicast channel (S,G) sent by the source 100 of FIG. 1, the PIM-SM messages can be JOIN(S,G)-type messages to request receiving the traffic from source 100 or PRUNE(S,G)-type messages to request no longer receiving the traffic from source 100.

Assuming that host 160 is initially receiving the multicast channel (S,G) transmitted by the source 100, the process taking place when the host 160 sends, for example, an IGMPv3 or MLDv2 message to the router 150 to indicate that it wishes to stop receiving the traffic of said channel (S,G) will be analyzed below. When this occurs, the router 150 sends a PRUNE(S,G) message to the router 140 to indicate to it that it no longer wishes to receive the channel (S,G). Said PRUNE (S,G) message is transmitted through network interface 151 of router 150 by means of multiaccess network 145 and is received through network interface 142 of router 140.

In the prior art, the router 140 waits for 3 seconds to see if there is any router that is still interested in receiving channel (S,G), in which case said interested router must immediately send to router 140 a JOIN(S,G) message before the three seconds elapse so that router 140 can thus continue transmitting traffic (S,G). If the three seconds elapse and no router connected to the network 145 sends a JOIN(S,G) message, router 140 will stop transmitting the multicast channel (S,G) through its network interface 142 and will transmit another PRUNE(S,G) message towards router 130 by means of the multiaccess network 135. The same process is repeated in the next routers 130 and 120, which send successive PRUNE(S, G) messages. Three seconds of a wait are added in each router to check if in each multiaccess network 135, 125 there is any other router interested in receiving the channel (S,G). The final result is that in the prior art, from when router 150 sends the first PRUNE(S,G) message until router 110 stops transmitting the channel (S,G), there is a total delay of 12 seconds (3 seconds successively in each of the routers) during which time router 110 has unnecessarily continued to transmit the traffic of channel (S,G).

In some implementations of the present invention the reduction or elimination of this latency problem involves in a PIM-SM router, which receives through a network interface a PIM-SM type message from another router requesting multicast traffic, identifies and stores the IP address of the router of origin of said PIM-SM message. In one implementation, the IP address of origin of the PIM-SM messages is obtained from the Source Address field of the IP packets transporting said PIM-SM messages. Thus, a router according to one aspect may know exactly, for each of its network interfaces, which equipment is interested in receiving each type of multicast traffic at all, or essentially all, times. By performing individual control of the traffic requested by each router, when a router according to one aspect of the present invention receives a PRUNE-type message to stop transmitting a specific multicast traffic, said router no longer needs to wait a certain time to see if another router sends a JOIN-type message in relation to the same multicast traffic, because it knows exactly which multicast traffic is requested by each router. If the router knows that there is no other router that wishes to receive said multicast traffic, it can immediately cancel the transmission thereof, thereby completely eliminating the latency.

An improved router according to one implementation performs a function that RFC 4601 specifications, at the end of section 4.5.7, assert is impossible, i.e. performing individual tracking of the multicast traffic requests from the downstream routers without first eliminating message suppression in all the routers of the multiaccess network. According to certain aspects of the present invention, the importance or need for message suppression is reduced or eliminated altogether.

A PIM-SM router has an independent upstream state machine (S,G) for each network interface of the router and for each multicast channel (S,G). This upstream state machine (S,G) has only two states: a Not_Joined (NJ) state meaning that the router does not need to receive the multicast channel (S,G) through said network interface, and a Joined (J) state meaning that the router needs to receive the multicast channel (S,G) through said network interface. It is not considered necessary to explain in detail the operation of the upstream state machine (S,G) used to send Join(S,G) messages in the PIM-SM protocol, because it is already explained in mentioned section 4.5.7 of RFC 4601.

Certain features of the PIM-SM used in various implementations, are the following:

When going from a Not Joined (NJ) state to a Joined (J) state, a PIM-SM router always sends a JOIN(S,G) message.

When going from a Joined (J) state to a Not Joined (NJ) state, a PIM-SM router always sends a PRUNE(S,G) message.

As a result of these two features the following feature is true:

To each initial JOIN-type message sent by a specific PIM-SM router to request specific multicast traffic will always correspond a final PRUNE-type message coming from the same router when the latter wishes to stop receiving said multicast traffic.

Therefore, a router executing the PIM-SM protocol always sends an initial JOIN(S,G) message when the router wishes to start receiving traffic of the multicast channel (S,G) and always sends a final PRUNE(S,G) message when said router wishes to stop receiving said multicast channel. The JOIN(S, G)-type messages that the PIM-SM router can suppress are only the periodical JOIN(S,G)-type messages that are re-sent when the timer called "Join_Timer" expires, but the initial JOIN(S,G) message is never suppressed.

This is also the case independently of whether or not message suppression is activated. As a result of these features of the PIM-SM upstream state machine, a router or switch (as later described) according to some implementations can exactly track the multicast traffic that each PIM-SM router wants, both if message suppression is activated and if it is not, and it is not necessary for all the routers to agree to eliminate message suppression as required in RFC 4601.

In one implementation, an improved router uses these features in the following manner: it performs the individual tracking of the multicast traffic requested by each downstream router, for example traffic (S,G), using the initial JOIN (S,G) message received from each router and the final PRUNE(S,G) message received from each router. As a result, a router according to an implementation applying, for example, the PIM-SM protocol can perform said individual tracking of the multicast traffic even though the periodical JOIN(S,G) messages that the other routers send between an initial JOIN(S,G) message and a final PRUNE(S,G) message are suppressed.

Therefore, a router in one implementation applying, for example, the PIM-SM protocol can track the multicast traffic requested by each downstream router, both if message suppression is activated and if it is not, in contrast with what is provided in RFC 4601. Furthermore, and also in contrast with what is provided in RFC 4601, to that end it is not necessary for all the routers to agree to cancel message suppression.

In summary, an improved router according one aspect of the present invention is suitable for operating in a communications network according to, for example, the PIM-SM protocol in which the other routers can be both routers that operate and do not operate in accordance with the principles of the present invention, and the improved router can perform individual tracking of the multicast traffic requested by the other routers independently of whether or not the non-improved routers (e.g., routers of the prior art) have cancelled message suppression.

In the prior art, the routers applying the PIM-SM protocol send periodic JOIN(S,G) messages to prevent, if a final PRUNE(S,G) message is lost, the upstream router that has not received said lost PRUNE(S,G) message from continuing to transmit channel (S,G) indefinitely towards a network even though there is no router interested in receiving said channel. The upstream router updates a timer called Expiry_Timer every time it receives a JOIN(S,G) message, whether it is the initial message or one of the periodic messages. When the Expiry_Timer reaches zero, the router stops transmitting channel (S, G).

In one implementation, a router which performs individual tracking of the multicast traffic requested by each router, for example traffic (S,G), using the first JOIN(S,G) message received from each router and the PRUNE(S,G) message received from each router, it is also appropriate to use a timer that prevents a specific multicast traffic from continuing to be indefinitely transmitted if an IP packet transporting a PRUNE message is lost. A detailed operation of this timer according to one implementation, is explained below.

Even though the preceding explanations relate to the type of multicast traffic (S,G) and to the corresponding PIM-SM JOIN/PRUNE (S,G)-type messages, the explanation can be applied to the three other types of multicast traffic and to their corresponding PIM-SM messages which, as known by the person skilled in the art, are the following:

Traffic (*,*,RP); JOIN/PRUNE (*,*,RP)-type messages
Traffic (*,G); JOIN/PRUNE (*,G) messages
Traffic (S,G,rpt); JOIN/PRUNE (S,G,rpt) messages Table 1 shows the operation of a downstream state machine (S,G) of a router according to one implementation with the state machine managing the control of the state of the multicast traffic (S,G) depending on the JOIN/PRUNE (S,G) messages received through each network interface of said router. The person skilled in the art will easily understand that the concepts explained below for the state machine (S,G) and the JOIN/PRUNE (S,G)-type messages can also be applied to the three other types of multicast traffic and to their corresponding PIM-SM messages.

In one implementation, the state machine of Table 1 stores the state information of each type of multicast traffic requested in records having the following form:

RECORD (Interface, Traffic_Type=(S,G), Expiry_Timer, {(IP_Router, IP_Timer)})

where:

Interface is the network interface of the router in which the PIM-SM messages are received.

Traffic_Type is a parameter indicating the type of multicast traffic. The state machine of Table 1 relates to the type of traffic (S,G), where S is the IP address of origin of the source and G the IP address of the multicast group. This is why Traffic_Type=(S,G) has been indicated. However, it could also be any other of the four types of multicast traffic mentioned above.

Expiry_Timer or ET is a timer that restarts every time a JOIN-type message relating to the type of traffic indicated in the Traffic_Type field reaches the network interface indicated in the Interface field. If the Expiry_Timer reaches zero, the router stops transmitting the traffic indicated in the Traffic_Type field (in this case the traffic (S, G)) through the network interface indicated in the Interface field.

{(IP_Router, IP_Timer)} is a list of elements (IP_Router, IP_Timer), wherein IP_Router is the IP address of the router that has sent the PIM-SM message and wherein IP_Timer is a timer associated to each IP_Router which restarts every time the network interface indicated in the Interface field receives a JOIN-type message from the router the IP of which is IP_Router. In one implementation, the value used to restart timer IP_Timer is the value of the holdtime parameter contained in the JOIN(S,G) message. The holdtime parameter is a parameter transmitted in the JOIN(S,G) messages of the PIM-SM protocol, in a manner known by a person skilled in the art, and indicating the time that the router sending the JOIN message(S,G) wishes to be receiving channel (S,G). In one implementation, the IP address of the router that has sent the PIM-SM message is extracted from the address of origin of the IP datagram encapsulating said PIM-SM message.

In the state machine of Table 1, which as mentioned relates to a specific network interface of the router and a specific type of multicast traffic (in this case the traffic of type (S,G)), the first column contains an initial state of the router, the second column contains a message or event, the third column contains the final state of the router as a result of said message or event of the second column and the fourth column contains the actions that the router performs in each case.

A downstream network interface of the router can be in the following states for a specific multicast channel (S, G):

NI (No_Info). This state indicates that the network interface of the router has no information indicating to the router that it should transmit channel (S,G) through said network interface. Therefore, in the NI state the router does not transmit channel (S,G).

JOIN ({IP}), where {IP} is a list of IP addresses of PIM-SM routers that have sent to the router JOIN(S,G)-type messages. In this state, the router is transmitting channel (S,G) through said network interface because there is a series of routers that have requested it (the routers of the {IP} list).

Table 1 describes eight processes numbered from 1 to 8 and separated from one another by dotted lines. These eight processes form the downstream state machine (S,G) of a router according to one implementation of the present invention.

Process 1 is executed when the router is in NI state and receives a JOIN(S,G) message from a router the IP of which is IP1. The router switches to the JOIN (IP1) state and initializes the timer T(IP1) associated to the IP1 address and the timer Expiry_Timer or ET with the value of the holdtime parameter contained in the JOIN(S,G) message received. The router begins to transmit the multicast channel (S,G) through the network interface through which it has received said JOIN (S,G) message.

The holdtime parameter of the PIM-SM messages is described in section "4.9.5 Join/Prune Message Format" of RF 4601, and indicates the time in seconds during which the router receiving the message must maintain the Joined or Pruned state.

In process 2, the router is already transmitting channel (S,G) and receives a new JOIN(S,G) message from a router the IP of which, indicated as IP2, is not in its list of IP addresses of the record associated to channel (S,G). In this case, the router adds the IP2 address to its list and starts the value of the timer T(IP2) with the value of the holdtime parameter of the message received. If the value of the ET timer is greater than the holdtime parameter contained in the JOIN(S,G) message received, the ET timer is not modified. In the opposite case, i.e. when the ET timer has a value that is less than holdtime, this holdtime value is put in the ET timer. This operation has been indicated in Table 1 by means of the expression "ET →HT". In this second process, the router keeps transmitting channel (S,G).

In process 3, the router receives a JOIN(S,G) message from a router the IP of which, which in this case is IP1, is already in its list. In this case it simply updates the timers T(IP1) and ET as explained in process 2, and keeps transmitting channel (S,G).

In process 4, the router receives a PRUNE(S,G) message from a router the IP address of which, which in this case is IP2, is in its list, but IP2 is not the only element of its list. The router eliminates IP2 from its list and keeps transmitting channel (S,G).

In process 5, the router receives a PRUNE(S,G) message from a router the IP address of which, which in this case is IP1, is the last address in the record associated to the channel (S,G). In this case the router eliminates the IP1 address from the list, stops transmitting the channel (S,G) and switches to the NI state.

In process 6, the timer T(IP1) associated to IP1, which is the only element in the IP list, reaches the value zero. In this case, the router eliminates IP1 from the list, stops transmitting the channel (S,G) and switches to the NI state.

In process 7, the timer T(IP2) associated to an IP2, which is not the only element of the list, reaches the value zero. In this case, the router must take into account whether or not the router sending the PIM-SM messages from the IP2 address is a router that has cancelled message suppression. In the first case, the router eliminates the IP2 address from the list and in the second case maintains the IP2 address even though the timer T(IP2) is zero.

How a router according to one implementation, this invention knows if the other routers have cancelled message suppression will be described below.

Process 8 shows an example of what happens when the ET timer reaches zero. In this case, the router eliminates all the IPs from the list, switches to the NI state and stops transmitting channel (S,G).

Routers implemented according to various aspects of the present invention can be configured to always cancel periodic message suppression, even though there are routers in the network that have not announced their capacity to cancel message suppression.

Furthermore, routers implemented according to various aspects of the present invention have a mechanism for knowing whether or not the other routers of a network operate in accordance with the principles of the present invention. This is convenient for two reasons. In the first place, in some implementations, a downstream router according to the present invention needs to know whether or not an upstream router it sends PIM-SM type messages to operates in accordance with the principles of the present invention. For example, if a router R1 operates according to the principles of the present invention sends JOIN messages to a router R2, router R1 needs to know if router R2 operates according to the principles of the present invention because if router R2 is from the prior art, or otherwise does not operate in accordance with the principles of the present invention, and another router R3 sends a PRUNE message to router R2 relating to multicast traffic that router R1 wishes to keep receiving, router R1 must immediately send a JOIN message to cancel the effect of the PRUNE message of router R3. However, if router R2 operates according to the principles of the present invention, router R1 does not have to worry about the messages sent by the other routers because router R2 performs individual tracking of the requests of each router. In the second place, an upstream router that operates according to the principles of the present invention needs to know whether or not a downstream router sending PIM-SM type messages to operates according to the principles of the present invention and if the downstream router has cancelled message suppression even though not all the routers have agreed to cancel message suppression.

In the default mechanism of the prior art, as described in RFC 4601, the routers do not announce whether or not they have cancelled message suppression; they announce if they have the capacity to cancel message suppression. Only when all the routers of a network have announced that they have the capacity to cancel message suppression do all the routers commonly cancel message suppression.

In process 7 of Table 1, the upstream router knows that the downstream router has cancelled message suppression if either of the following two circumstances occurs:
a) the downstream router has communicated that it is a router that operates according to the principles of the present invention and whether or not it cancels the periodic messages.
b) all the routers of the network have announced their capacity to cancel message suppression.

To communicate that they operate according to the principles of the present invention and whether or not they suppress periodic messages, the routers can announce it in their Hello messages they periodically send through all their network interfaces where they execute the PIM-SM type protocol.

A first way to announce it consists of defining a new data block of the type called Option with a new OptionType value in the Hello message. The different values of the OptionType parameter of the Hello messages are explained in section 4.9.2 of RFC 4601 and currently range from 1 to 20. A value outside this range, for example OptionType=30, can be used to announce that a router operates according to the principles of the present invention and one of the fields or parameters of the new message can be used to indicate if the router has cancelled periodic message suppression.

A second way of announcing this capacity consists of using the LAN_PRUNE_Delay data block and putting a special value in the Override_Interval parameter, for example the values 0 and 1 which make little sense as a wait value in milliseconds. Therefore, for example, when the routers that operate according to the principles of the present invention receive a Hello message the Override_Interval value of which is 0, they know it is sent by a router that operates according to the principles of the present invention and has cancelled message suppression. If they receive the value 1, they interpret that the router that has sent the message operates according to the principles of the present invention but it has not cancelled message suppression.

Again in reference to the example of the FIG. 1, assume that routers 110, 120, 130, 140 and 150 are routers that operate according to the principles of the present invention. When the host 160 sends, for example, a IGMPv3 or MLDv2 message to router 150 to indicate that it wishes to stop receiving traffic of channel (S,G), router 150 sends a PRUNE(S,G) message to router 140. According one implementation, router 140 maintains a record of traffic (S,G) requested in its network interface 142 for each of the routers of the multiaccess network line 145 that have requested traffic by sending PIM-SM messages to said router 140. As a result, router 140 knows if there is a router that still wishes to receive channel (S; G). If this is not the case, when router 140 receives the PRUNE (S,G) message sent by router 150, it immediately performs the following actions: it stops transmitting multicast traffic through its downstream network interface 142 and sends a PRUNE(S,G) message to router 130. The same process occurs successively in routers 130 and 120: when each of them receives the PRUNE(S,G) message from the downstream router, if its record for traffic (S,G) requested in its downstream network interface, respectively 132 and 122, indicates that there is no router interested in receiving channel (S,G), said router 130, 120 immediately stops sending traffic through its said downstream network interface and sends a PRUNE(S,G) message to the next upstream router. When router 110 receives the PRUNE(S,G) message from router 120, it performs the same process as routers 140, 130 and 120, the difference being that it does not send a PRUNE(S,G) message, because it is directly connected to the source 100.

Therefore, after the moment in which router 150 sends the first PRUNE(S,G) message, if in the multiaccess network lines 145, 135, 125 and 115 there is no other router interested in receiving channel (S,G), router 110 stops transmitting channel (S,G) virtually immediately. In fact, the only delay occurring, in addition to the delay inherent to the transmission of the PRUNE messages through the network, which is done in a very short time and is inevitable anyway, is the delay corresponding to the time necessary for each router to update and check its records of requested multicast traffic, according to the principles of the present invention. However, these are operations that a router can perform in extremely short times, as is known by a person skilled in the art.

The individual tracking of the requests of each PIM-SM type router performed as a result of the router that operates according to the principles of the present invention has other important applications in addition to the advantages already explained. For example, it allows accounting for or authorizing multicast traffic, which is generally called AAA (Authentication, Authorization and Accounting). This can advantageously be carried out, for example, by associating information relating to the AAA a each element (IP_Router, IP_Timer) of the list {(IP_Router, IP_Timer)} of the record of multicast traffic of each router. An improved router can thus apply specific conditions relating to the accounting and/or to the authorization for the transmission of a type of multicast traffic to a specific router, identified by the IP_Router address and for which said improved router has information stored relating to the AAA.

Specifications RFC 4541 edited on-line by the IETF (M. Christensen et al., Engineering Task Force, Network Working Group, Request for Comments 4541, May 2006) describe the operation of a switch performing a function called IGMP Snooping, which prevents that all the multicast data packets have to be sent to all the ports of the switch (this is what occurs by default when the IGMP Snooping function is not performed).

By means of snooping techniques, the switch, which in theory is level 2 equipment in the OSI (Open Systems Interconnection) model and neither knows nor uses level 3 protocols like the IP protocol, analyzes the IP data packets containing the messages of multicast protocols, such as the IGMP and PIM-SM protocols, and creates a table with information of the multicast channels or groups that must be sent through each of their ports. The switch thus sends through each of its ports only the multicast channels that the hosts or routers connected to said port have requested.

The use of snooping techniques is widespread in the IGMP protocol but not in the PIM protocol. The snooping technique in the PIM-SM protocol, which is called PIM Snooping, is rather underdeveloped due to the fact that PIM-SM is a much more complex protocol than IGMP and also due to the problems relating to message suppression that have been explained above, i.e. JOIN-type message suppression involves, in the prior art, difficulties for performing individual tracking of the multicast traffic requests of each PIM-SM router (RFC 4601 literally state that "it is not possible").

An improved switch according to one implementation differs from a switch from the prior art performing "PIM-Snooping" in that the information obtained by means of the snooping is stored separately, for each port of the switch, for each router of origin that has sent a PIM-SM message.

The structure of the records storing the information obtained by snooping the IP packets containing PIM-SM type messages going through the switch is similar to that explained above for an improved router, with the difference that in an improved switch the records store the information for each port of the switch (instead of for each network interface as in the improved router). In one implementation the structure of the record is the following:

RECORD (Switch_Port, Traffic_Type=(S,G), Expiry_Timer, {(IP-Router, IP-timer)})

where "Switch_Port" is a field containing an identification of the port of the switch to which the record refers, and the other fields, Traffic_Type=(S,G), Expiry_Timer and {(IP_Router, IP_Timer)}, have a meaning that is similar to what has been explained above for the record of an improved router.

In one implementation an improved switch operates according to a state table which is similar to the state machine of the router illustrated in Table 1, with the difference that the state table of the switch relates to a specific port of the switch, instead of to a specific network interface of the router.

In one implementation, when an improved switch receives a PIM-SM type message through a specific port, relating to a specific type of multicast traffic and coming from a specific router, said switch updates its state table in the same way as an improved PIM-SM router does, as explained above with the aid of Table 1. The improved switch keeps the state table information updated in a similar manner as the improved router does. This allows the improved switch to interrupt the traffic of a channel (S,G) when it knows that there is no router interested in receiving said channel.

In one implementation an improved switch further makes its decision to send traffic of a specific multicast channel through a specific port of the switch or not, taking into account if the PIM-SM router connected to said port is or is not an improved router. To know if the PIM-SM routers connected to its ports are not improved routers (e.g., routers of the prior art) or are improved routers, the improved switch has a table that allows manually configuring this information. The improved switch can alternatively detect if the router is an improved router by analyzing the Hello messages of each PIM-SM router.

In another embodiment, the improved switch uses as an identifier of each router requesting multicast traffic, instead of the IP address of said router, the MAC Address ("Media Access Control Address") of each network interface of each router sending PIM-SM messages through the switch. The use of the MAC Address may be convenient in the switches because the latter have a table storing which port of the switch each network interface having a specific MAC address is connected to.

In this embodiment, which uses the MAC Address of the routers, the structure of the record may be as follows:

RECORD (Port of the Switch, Traffic_Type=(S,G), Expiry_Timer, {(MAC_Router, IP_Timer)})

where "MAC_Router" is the MAC Address of the network interface of the router sending PIM-SM type messages, and the other fields and elements of the record have the same meaning as that described above.

As in the previous case, in which the IP address is used to identify the routers, in this case the router operates according to a state table that is similar to the state machine of the router illustrated in Table 1, with the added difference that the IP address of the router sending PIM-SM messages is replaced by the MAC Address of said router.

It must finally be indicated that throughout the foregoing description, the invention has been described as applied to the PIM-SM (Protocol Independent Multicast—Sparse Mode) protocol. However, as a person skilled in the art will easily understand, the invention can also be applied to other router-to-router communication protocols such as, for example, protocols incorporating the PIM (Protocol Independent Multicast) protocol, such as for example the PIM-DM (Protocol Independent Multicast—Dense Mode) protocol or the PIM-BIDIR (Protocol Independent Multicast—Bidirectional Mode) protocol, or any similar types or versions of such protocols.

TABLE 1

| | STATE 1 | MESSAGE/EVENT | STATE 2 | ACTIONS |
|---|---|---|---|---|
| 1. | NI | JOIN(S,G) FROM(IP1) | JOIN(IP1) | T(IP1) = HT ET = HT |
| 2. | J(IP1) | JOIN(S,G) FROM(IP2) | JOIN(IP1+IP2) | T(IP2) = HT ET -> HT |
| 3. | J(IP1) | JOIN(S,G) FROM(IPl) | JOIN(IP1) | T(IP1) = HT ET -> HT |
| 4. | J(IP1,IP2) | PRUNE(S,G) FROM(IP2) | JOIN(IP1) | DEL (IP2) |
| 5. | J(IP1) | PRUNE(S,G) FROM (IP1) | NI | DEL (IP1) |
| 6. | J(IP1) | T(IP1) = 0 | NI | DEL (IP1) |
| 7. | J(IP1,IP2) | T(IP2) = 0 | JOIN(IP) JOIN(IP1,IP2) | IF [NSP(IP2)] DEL (IP2) |
| 8. | J(...) | ET = 0 | NI | DEL ALL IP |

Abbreviation definitions in Table 1 are as follows:
NI: No_Info state
J: JOIN state relating to indicated IP addresses
T: timer associated to the indicated IP address
ET: Expiry_Timer
HT: value of the Holdtime parameter in the JOIN message received
FROM: message sent from the indicated IP address
DEL: delete the indicated IP address from the record
DELL ALL IP: delete all IP addresses from the record
NSP: the router of the indicated IP address does not suppress messages
IF: the action is performed if the indicated condition is met

What is claimed is:

1. A method of managing multicast traffic, the method comprising:
   individually tracking in an upstream PIM router the join membership of one or more individual downstream PIM routers that are coupled to a network interface of the upstream PIM router via a multi-access network without disabling JOIN message suppression in all the individual downstream PIM routers, wherein the join membership identifies a type of multicast traffic, the upstream PIM router storing a record for the network interface and each type of multicast traffic information that individually identifies the one or more downstream PIM routers requesting the type of multicast traffic;
   maintaining by the upstream PIM router, for each network interface and each type of multicast traffic, a first timer that is restarted each time a join membership reaches the network interface, terminating, by the upstream PIM router, transmission of the type of multicast traffic when the first timer attains a value of zero; and
   maintaining by the upstream PIM router a second timer associated with each of the one or more downstream PIM routers upon receiving a join membership from the one or more downstream PIM routers, respectively, the second timer indicating the amount of time a downstream PIM router wishes to receive traffic from a type of multicast traffic.

2. A method according to claim 1 further comprising determining in the upstream PIM router whether to transmit from the interface the one or more types of multicast traffic by use of the record.

3. A method according to claim 1, wherein the one or more types of multicast traffic is selected from the group consisting of (S,G), (*,*,RP), (*,G) and (S,G,rpt).

4. A method according to claim 1, wherein the join membership is a PIM type messages selected from the group consisting of JOIN(S,G), JOIN(*,*,RP), JOIN(*,G) and JOIN(S,G,rpt).

5. A method according to claim 1, wherein the information that individually identifies a downstream PIM router is an IP address of the downstream PIM router.

6. A method according to claim 1, wherein the join membership is a JOIN(S,G) message and the initial value of the second timer is the value of the holdtime parameter contained in the JOIN(S,G) message.

7. A method according to claim 1, wherein the join membership is encapsulated in an IP datagram, the IP address being extracted from the address of origin of the IP datagram.

8. A method according to claim 1, wherein join membership is transported in a packet, the IP address being extracted from the source address field of the packet.

9. A method according to claim 1, wherein the type of multicast traffic is (S,G) and the upstream PIM router stores executable instructions to update the record and implement the actions according to one of the processes of Table 1.

10. A method of managing multicast traffic, the method comprising:
    receiving in a network interface of a first router one or more PIM type messages from one or more second routers requesting one or more types of multicast traffic, wherein the one or more PIM type messages are JOIN and/or PRUNE type messages;
    storing in the first router a record for each network interface and each type of multicast traffic information that individually identifies the one or more second routers requesting the type of multicast traffic; and
    determining in the first router whether to transmit from the interface the one or more types of multicast traffic by use of the record, wherein for each network interface and each type of multicast traffic the first router maintains a first timer that is restarted each time a JOIN type message reaches the network interface, the first router terminating transmission of the type of multicast traffic when the first timer attains a value of zero;
    wherein the first router maintains a second timer associated with each of the one or more second routers upon receiving a PIM type message from the one or more second routers, respectively, the second timer indicating the amount of time a second router wishes to receive traffic from a type of multicast traffic.

11. A method according to claim 10, wherein the one or more types of multicast traffic is selected from the group consisting of (S,G), (*,*,RP), (*,G) and (S,G,rpt).

12. A method according to claim 10, wherein the one or more PIM type messages is selected from the group consisting of JOIN(S,G), PRUNE(S,G), JOIN(*,*,RP), PRUNE(*,*,RP), JOIN(*,G), PRUNE(*,G), JOIN(S,G,rpt) and PRUNE (S,G,rpt).

13. A method according to claim 10, wherein the information that individually identifies a second router is an IP address of the second router.

14. A method according to claim 13, wherein the PIM type message is encapsulated in an IP datagram, the IP address being extracted from the address of origin of the IP datagram.

15. A method according to claim 13, wherein PIM type message is transported in a packet, the IP address being extracted from the source address field of the packet.

16. A method according to claim 10, wherein the PIM type message is a JOIN(S,G) message and the initial value of the second timer is the value of the holdtime parameter contained in the JOIN(S,G) message.

17. A method according to claim 10, wherein when only a single second router is requesting a type of multicast traffic through the network interface, transmission of the type of multicast traffic through the network interface is terminated upon the second timer attaining a value of zero.

18. A method according to claim 10, wherein the type of multicast traffic is (S,G) and the first router stores executable instructions to update the record and implement the actions according to one of the processes of Table 1.

19. A method of maintain multicast traffic, the method comprising:
    receiving in a network port of a switch one or more PIM type messages from one or more second routers requesting one or more types of multicast traffic, wherein the one or more PIM type messages are JOIN and/or PRUNE type messages;
    snooping the one or more PIM type messages to obtain first information that individually identifies the one or more second routers requesting the type of multicast traffic;
    storing in the switch a record for each network port and each type of multicast traffic the first information; and
    determining whether to transmit from the network port the one or more types of multicast traffic by use of the record,
    wherein for each network port and each type of multicast traffic the switch maintains a first timer that is restarted each time a JOIN type message reaches the network port, the switch terminating transmission of the type of multicast traffic when the first timer attains a value of zero and wherein the switch maintains a second timer associated with each of the one or more second routers upon receiving a PIM type message from the one or more second routers, respectively, the second timer indicating the amount of time a second router wishes to receive traffic from a type of multicast traffic.

20. A method according to claim 19, wherein the PIM type message is a JOIN(S,G) message and the initial value of the second timer is the value of the holdtime parameter contained in the JOIN(S,G) message.

21. A method according to claim 20, wherein the one or more types of multicast traffic is selected from the group consisting of (S,G), (*,*,RP), (*,G) and (S,G,rpt).

22. A method according to claim 20, wherein the one or more PIM type messages is selected from the group consisting of JOIN(S,G), PRUNE(S,G), JOIN(*,*,RP), PRUNE(*,*,RP), JOIN(*,G), PRUNE(*,G), JOIN(S,G,rpt) and PRUNE (S,G,rpt).

23. A method according to claim 20, wherein the first information that individually identifies a second router is an IP address of the second router.

24. A method according to claim 23, wherein the PIM type message is encapsulated in an IP datagram, the IP address being extracted from the address of origin of the IP datagram.

25. A method according to claim 23, wherein PIM type message is transported in a packet, the IP address being extracted from the source address field of the packet.

26. A method according to claim 19, wherein when only a single second router is requesting a type of multicast traffic through the network port, transmission of the type of multicast traffic through the network interface is terminated upon the second timer attaining a value of zero.

27. A method according to claim 19, wherein the type of multicast traffic is (S,G) and the switch stores executable instructions to update the record and implement the actions according to one of the processes of Table 1.

* * * * *